United States Patent [19]

O'Hara et al.

[11] Patent Number: 5,128,220
[45] Date of Patent: Jul. 7, 1992

[54] METHOD FOR FIBER COATING TACKY ACTIVE ELECTRODE STRIPS

[75] Inventors: Thomas J. O'Hara, Bay Village; Theodore P. Dziak, Fairview Park, both of Ohio

[73] Assignee: Eveready Battery Company, Inc., St. Louis, Mo.

[21] Appl. No.: 625,568

[22] Filed: Dec. 11, 1990

[51] Int. Cl.⁵ .................. H01M 2/16; H01M 2/18; B05D 5/12; B05D 1/12

[52] U.S. Cl. .................. 429/137; 429/144; 429/145; 429/246; 29/623.4; 427/115; 427/180

[58] Field of Search ............... 429/137, 144, 145, 246; 29/623.4, 623.5; 427/115, 208.6, 126.2, 180

[56] References Cited

U.S. PATENT DOCUMENTS

| Re. 23,644 | 4/1953 | Grant | 429/144 |
|---|---|---|---|
| 3,721,113 | 3/1973 | Hovsepian | 72/46 |
| 3,783,666 | 1/1974 | Rosansky | 72/199 |
| 4,060,017 | 11/1977 | Backlund | 83/23 |
| 4,069,375 | 1/1978 | Lauck | 429/218 |
| 4,085,256 | 4/1978 | Dey | 429/48 |
| 4,315,976 | 2/1982 | Conte | 429/194 |
| 4,615,961 | 10/1986 | Park | 429/218 |
| 4,675,258 | 6/1987 | McLoughlin et al. | 429/137 |
| 4,882,828 | 11/1989 | McLoughlin et al. | 429/246 |
| 4,892,559 | 1/1990 | Park et al. | 429/137 |

Primary Examiner—William R. Dixon, Jr.
Assistant Examiner—Deborah Jones
Attorney, Agent, or Firm—Robert W. Welsh

[57] ABSTRACT

Electrode strips, such as lithium electrode strips, having a tacky surface to which a plurality of fibers are adhered to such surface so as to reduce the tackiness of such surface, and a method for coating the tacky surface of such electrode strips with such fibers.

14 Claims, No Drawings

5,128,220

METHOD FOR FIBER COATING TACKY ACTIVE ELECTRODE STRIPS

FIELD OF THE INVENTION

The invention relates to a method for reducing the tackiness of active electrode strips, such as a lithium strip, by contacting the strips with a fibrous material and then removing the fibrous material, leaving some of the fibers adhered to or embedded in the surface of the strip thereby reducing tackiness of such strip. The invention also relates to fiber-coated active electrode strips.

BACKGROUND OF THE INVENTION

The development of high energy cell systems requires the compatibility of an electrolyte possessing desirable electrochemical properties with highly active anode materials, such as lithium, calcium, sodium and the like, and the efficient use of high energy density cathode materials, such as $FeS_2$, $Co_3O_4$, $PbO_2$, $TiS_2$, $Li_xCoO_2$, $MnO_2$, $(CF_x)_n$, oxyhalides and the like. One drawback in the manufacturing and assembling of these high energy cell systems is that the anodes, such as lithium, are usually soft, sticky material having a tendency to stick together when they are transported between areas for assembly into cells. In addition, anodes such as lithium have a tendency to accumulate static charge buildup during their transportation from the manufacturing facilities to the assembling facilities.

To achieve optimum battery performance with respect to power output, the surface of electrodes, such as a lithium electrode, should be made as large as is practicable. To achieve an electrode having an optimum surface area, it is generally necessary to roll the lithium metal to a predetermined length and thickness. When attempts have been made to roll and shape sheet or foil of lithium, the lithium may adhere to the rollers and as a result, efforts at rolling thin lithium sheets or foils have generally been extremely difficult.

In the manufacture of soft, sticky strips of lithium, it has been proposed in the prior art, specifically U.S. Pat. No. 3,721,113, that thin continuous lithium strips can be produced by cold rolling lithium metal while it is compressed between smooth surfaces of a solid polymeric composition, which composition is nonreactive with lithium and has a critical surface tension of not over 46 dynes per centimeter at 20° C. The use of the polymeric sheet material is essential so as to prevent the sticking of the lithium to the metal surfaces of the roller. Once continuous lithium strips are produced, another problem encountered is in the cutting of the lithium metal into a plurality of pieces which can be employed as lithium anodes in various types of cell systems. To overcome this problem it is disclosed in the prior art, specifically U.S. Pat. No. 4,060,017, that a flexible film, preferably of plastic, be interposed between the blade of a cutting device and a lithium strip such that when the blade is forced against the anvil with sufficient force to cut the lithium, the film prevents contact of the blade with the lithium. This will prevent any buildup of lithium being developed on the blade which would occur generally after only a few cutting operations. Although solutions in the prior art have been proposed for the manufacture of a plurality of lithium electrodes from lithium strip material, one problem that still exists is in the transporting of the lithium electrodes from the manufacturing site to the assembly site where they will be assembled into a cell. Rectangular, square, circular or other shaped lithium electrodes are usually transported to the assembly station where they are then fed into automatic feeding machines and assembled into a cell container. It has been observed that during the transporting to and automatic feeding of the lithium anodes at the assembly station, there is a tendency for freshly cut lithium anodes to stick to themselves and to accumulate static charge whereupon the anodes then tend to stick to other surfaces resulting in a disruption of the assembly operation. This problem is most pronounced in employing lithium anodes for miniature type button cells in which the anodes can be as small as a square measuring 0.22 inch by 0.10 inch thick. An additional problem encountered during the transporting to and the feeding of lithium anodes at the assembly site is that there is a tendency for a coating of the lithium to build up on any metallic or plastic surface that they contact. In the manufacture of lithium strips, this tendency of the lithium buildup on metal surfaces can be eliminated through the use of polymeric materials as described above in conjunction with U.S. Pat. NO. 3,721,113 and in the use of a flexible plastic film as discussed above in conjunction with U.S. Pat. No. 4,060,017. These solutions cannot be efficiently employed in the transportation of small size lithium anodes to the assembly site since such anodes are relatively small discrete bodies and any attempts to apply a plastic or polymeric material between the anodes would be time consuming, laborious and expensive.

U.S. Pat. No. 4,315,976 discloses a soft active anode coated on its surface with an electrically nonconductive and chemically and electrochemically inert particulate material in an amount between about 0.1 milligram per square centimeter and about 8 milligrams per square centimeter, preferably between about 0.3 milligram per square centimeter and about 4 milligrams per square centimeter, so as to retard static buildup and the tendency of the anode to stick to surfaces and other anodes prior to its assembly into a cell.

One of the objects of the present invention is to provide active electrode strips, such as a lithium strip, with a surface deposit of adhered fibers that will effectively reduce the tackiness of the electrode strip.

Another object of the present invention is to provide fibers embedded on the surface of a lithium strip so as to reduce the tackiness of the strip and thereby facilitate the handling of the strip prior to and during its assembly into a battery container.

Another object of the present invention is to provide a method for adhering fibers to the surface of an active electrode strip.

Another object of the present invention is to provide a method for adhering fibers to the surface of a lithium electrode strip to effectively reduce the tackiness of the lithium strip.

The foregoing and additional objects will become more fully apparent from the following description.

SUMMARY OF THE INVENTION

The invention relates to a method for facilitating the handling of an active electrode strip by reducing the tackiness of the surface of such strip comprising the steps:

a) preparing a strip of an active electrode material having a sticky surface;

b) preparing a fibrous material that is chemically nonreactive with the active electrode material and contains a plurality of fibers that can be removed from its surface; and c) contacting at least a portion of the strip of the active electrode material with said fibrous material and then removing the fibrous material, leaving some of the fibers adhered to the surface of the active electrode material thereby reducing the surface tackiness of the active electrode material.

As used herein, a strip shall mean any surface of geometric shape such as rectangular shape, square shape, circular shape or the like. For example, circular shaped strips could be cut from a large sheet to accommodate a particular size cell.

A tacky surface is one that when contacted against particulate matter such as powders, fibers, small discrete pieces of plastic, paper, metal and the like, will cause such particulate matter to adhere to the tacky surface, similarly to what would occur when using conventional adhesive tape to remove lint from apparel.

The active electrode strip so produced, will have on its surface a plurality of fibers adhered to or embedded onto the surface of the strip so that the tackiness of the surface of the strip is reduced to facilitate handling of the strip prior to and during assembly of the strip into a battery container. In addition, the fiber-coated active electrode strip can be easily cut into desired sizes and then assembled into various size cell containers more efficiently due to the reduction of the tackiness of the surface of the active electrode material. Another benefit of the fiber-coated electrode strip, particularly a lithium strip, is that the lithium strip can be more efficiently embedded deeper onto an anode collector grid during assembly while also reducing lithium buildup and sticking of the lithium to the machine pocket members on the embedding equipment.

The fibrous material for use in this invention can be any fibrous material that is chemically nonreactive with the active electrode material and which is preferably chemically compatible with the cell system in which the active electrode is to be used. Preferably, the fibrous material should be made of threads or a structure or object resembling threads so that small lengths of fibers can be removed from the material by use of an adhesive sheet or a sheet of material having a tacky surface. The size of the fibers that adhere to the surface of the active electrode material can vary widely with a fiber length of from 0.05 inch to 0.6 inch being preferred. The fibrous material could be a fibrous separator mat such as a woven or nonwoven glass fiber mat with or without a suitable binder. The fibrous material can contact the active electrode material with a slight force so as to enable the sticky surface of the active material to adhere to the fibrous material. Upon separation of the fibrous material from the active electrode material, a plurality of small fibers will remain adhered to and/or embedded in the surface of the active electrode. This fiber-coated surface will effectively reduce the tackiness of the active electrode material and thereby facilitate the handling of the electrode material. If desired, only selected areas of the active electrode material could be contacted with the fibrous material.

In the case of electrode foil extrusion, the contacting of the fibrous material to the active foil material can conveniently be done at any time between the extrusion step and the winding of the foil onto cores (spools) for storage or use in cell manufacture. Preferably, the fibrous material, such as a separator mat, is pressed onto the "machine side" of the foil, i.e., the side of the foil which tends to stick to machine parts during subsequent processing of the foil. If desired, both sides of the foil could be coated with fibers from the fibrous material. If only one side of the foil is coated with fibers, a layer of plastic film preferably about 0.001 to 0.005 inch thick, such as polyethylene, may be used to separate the uncoated side of the foil from the coated side of the foil before the foil is wound onto a spool. Removal or stripping of the fibrous material can occur at any time prior to assembling the active electrode material into a cell's container. For example, the fibrous material could be removed at the time the foil is manufactured or it could be removed at the time the foil is ready to be assembled into a cell's container. For most applications, the active electrode made of a foil could be from 0.003 to 0.060 inch thick, and preferably about 0.050 inch thick for AA size bobbin cells and about 0.010 inch thick for jellyroll cells. The fibers preferably should cover from about 10 to 90 percent of the surface of the active electrode material contacted by the fibrous material. The requirement of the coverage of the surface of the active electrode material with the fibers is that sufficient fibers be adhered to the surface to reduce the tackiness of the surface so that the electrode material can be easily and efficiently handled.

Soft active electrode members suitable for use in this invention can be selected from the group consisting of lithium, sodium, calcium and the like. It has been observed, specifically in the manufacture and assembling of lithium anodes into cells, that lithium has a tendency to stick to metal and plastic surfaces. By coating the surface of the electrode with the chemically nonreactive fibers, the fibers will act as a blocking layer to prevent lithium from sticking to other metal and plastic surfaces as well as to other lithium anodes.

Suitable solid active cathode materials are electrochemically reducible materials. Such materials include natural or synthetic iron sulfides such as $FeS_2$ and $FeS$, manganese oxides such as $MnO_2$, carbon fluorides such as $(CF_x)_n$ or $(C_2F)_n$, $V_2O_5$, $WO_3$, $MoO_3$, $MoS_2$, lead oxides, cobalt oxides, lithium cobalt oxide, lithium nickel cobalt oxide, copper oxides, copper sulfides, $In_2S_3$, $NiS$, $Ag_2CrO_4$, $Ag_3PO_4$, transition metal sulfides such as $TiS_2$, transition metal polysulfides, and mixtures thereof. By "active cathode" is meant the material being reduced in the electrochemical reaction. The active cathode material is formed into the positive electrode by mixing the active cathode material with an amount of a suitable conductive material such as carbon, if needed, and an amount of a suitable binder. The mixture can then be formed into a strip material or pressed, impregnated or coated onto a suitable carrier such as foil or expanded metal. After being formed into the strip, the electrode will typically have a cathode collector portion contacting the strip.

Suitable nonaqueous liquid cathode materials for use in cells of this invention could be one or more of the liquid oxyhalides of an element of Group V or Group VI of the Periodic Table and/or one or more of the halides of an element of Group IV to Group VI of the Periodic Table, said Periodic Table being the Periodic Table of Elements as set forth on the inside back cover of the Handbook of Chemistry and Physics, 63rd Edition, The CRC Press Inc., Boca Raton, Fla., 1982-1983. For example, such nonaqueous cathode materials would include sulfuryl chloride, thionyl chloride, phosphorus oxychloride, thionyl bromide, chromyl chloride, vanadyl tribromide, selenium oxychloride, sulfur monochloride, sulfur monobromide, selenium tetrafluoride, selenium monobromide, thiophosphoryl chloride, thiophosphoryl bromide, vanadium pentafluoride, lead tetrachloride, titanium tetrachloride, disulfur decafluoride, tin bromide trichloride, tin dibromide dichloride and tin tribromide chloride. Another suitable cathode material would be liquid sulfur dioxide.

Suitable electrolytes for use in the cells of this invention can be aqueous or nonaqueous. Nonaqueous electrolytes can employ organic or inorganic solvents containing a conductive solute. Suitable organic solvents include tetrahydrofuran (THF), dioxolane, dimethoxyethane (DME), dimethyl isoxazole (DMI), 3-methyl-2-oxazolidone, diethyl carbonate (DEC), propylene carbonate, ethylene carbonate, ethylene glycol sulfite (EGS), dioxane, dimethyl sulfite (DMS), or the like and mixtures thereof.

Suitable salts include: $MAlX_4$, $MCF_3SO_3$, $MSCN$, $MBF_4$, $MClO_4$, and $MM'F_6$ wherein M is lithium, sodium or potassium, M' is phosphorus, arsenic or antimony and X is chlorine or bromine. The particular salt selected is compatible and nonreactive with the solvent and the electrodes of the cell. The amount of salt to be added to the solvent should be sufficient to provide an ionically conductive solution with a conductivity of at least about $10^{-4} ohm^{-1} cm^{-1}$. Typically, about 0.5 M of the salt will be sufficient. An example of a preferred organic electrolyte is a mixture of dioxolane, 3-methyl-2-oxazalidone, and dimethoxyethane, and $LiCF_3SO_3$.

In the employment of the coated anode materials of this invention in a lithium-$SOCl_2$ cell system, the cell test results have shown that none of the fiber materials cause any problem with respect to cell discharge or storage characteristics. Consequently, through the use of the subject invention, coated anodes can be produced and then continuously and automatically transported and fed through various types of equipment and automatically assembled into cells at desirable production rates.

The following example is illustrative of the present invention and is not intended in any manner to be limited thereto.

EXAMPLE

Several lots of cells were constructed in which each cell employed a 0.33 gram lithium foil anode (measuring 1.34 inch long, 0.44 inch wide and 0.045 inch thick). A solution of a liquid cathode of $SOCl_2$ and $LiAlCl_4$ solute was used as the cathode-electrolyte. Prior to assembling the lithium onto the cell's container, a fibrous material of non-woven glass fiber mat was contacted against the lithium foil and then removed. This deposited a layer of fibers between about 0.06 inch and about 0.13 inch long having a diameter of 0.6 to 2.2 microns onto the surface of the lithium foil that facilitates the handling of the lithium foil during its assembly into the container of the cell. The glass fibers were chemically nonreactive with the lithium and chemically compatible with the cell system. Upon testing, the cells did not show any problem with respect to cell discharge or storage characteristically due to the use of a coated lithium foil rather than an uncoated lithium foil. It was observed that the coated anodes did not stick to the surface of the equipment used to transport them to the assembly site, to the surface of the equipment employed in assembling the coated anodes into the cells or to themselves prior to assembly into the cells. This resulted in an efficient, continuous automatic feeding of the anodes to the assembly site where they were then efficiently and automatically assembled into the cells.

What is claimed:

1. A method for facilitating the handling of an active electrode strip having a tacky surface comprising the steps:
    a) preparing a strip of an active electrode material having a tacky surface;
    b) preparing a fibrous material that is chemically nonreactive with the active electrode material and contains a plurality of fibers at its surface; and
    c) contacting at least a portion of the strip of the active electrode material with said fibrous material and then removing the fibrous material, leaving a plurality of fibers adhered to the surface of the active electrode material thereby reducing the surface tackiness of the active electrode material.

2. The method of claim 1 wherein the fibrous material is a woven glass fiber mat.

3. The method of claim 1 wherein the fibrous material is a nonwoven glass fiber mat.

4. The method of claim 1 wherein one side of the active electrode material is contacted by the fibrous material and after step c) the following step is added.
    d) placing a layer of plastic film onto a surface of the electrode strip and then rolling the laminate of plastic film and electrode strip onto a spool in which the plastic film separates the uncoated side of the strip from the fiber-coated side of the strip.

5. The method of claim 4 wherein the plastic film is polyethylene.

6. The method of claim 4 wherein the fibrous material is a woven glass fiber mat.

7. The method of claim 4 wherein the fibrous material is a nonwoven glass fiber mat.

8. The method of claim 1 wherein both sides of the active electrode material are contacted by the fibrous material.

9. The method of claim 8 wherein the fibrous material is a woven glass fiber mat.

10. The method of claim 8 wherein the fibrous material is a nonwoven glass fiber mat.

11. The method of claim 1 wherein the active electrode is an anode and said anode is selected from the group consisting of lithium, sodium and calcium.

12. The method of claim 11 wherein the anode is lithium.

13. The method of claim 12 wherein the fibrous material is a woven glass fiber mat.

14. The method of claim 12 wherein the fibrous material is a nonwoven glass fiber mat.

* * * * *